United States Patent
Toth et al.

(10) Patent No.: US 6,729,390 B1
(45) Date of Patent: May 4, 2004

(54) CONTROL FOR HEAT PUMP WITH AUXILIARY HEAT SOURCE

(75) Inventors: Bartholomew L. Toth, St. Louis, MO (US); Frank A. Albanello, St. Louis, MO (US); David L. Perry, St. Louis, MO (US); Dennis Snow, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/872,354

(22) Filed: Jun. 1, 2001

(51) Int. Cl.[7] .............................................. F25B 30/00
(52) U.S. Cl. ....................... 165/242; 165/240; 165/241; 237/2 A; 237/2 B
(58) Field of Search ................................ 165/240, 241, 165/242; 237/2 A, 2 B, 2 R

(56) References Cited

U.S. PATENT DOCUMENTS

| | | | |
|---|---|---|---|
| 4,627,483 A | | 12/1986 | Harshbarger, III et al. |
| 4,971,136 A | * | 11/1990 | Mathur et al. .......... 237/2 B X |
| 5,402,845 A | * | 4/1995 | Jeffery et al. |
| 5,405,079 A | * | 4/1995 | Neeley et al. .............. 237/2 B |
| 5,438,844 A | * | 8/1995 | Hoglund et al. |
| 5,533,568 A | * | 7/1996 | Schuster et al. ........ 238/2 B X |
| 5,628,199 A | * | 5/1997 | Hoglund et al. |

* cited by examiner

Primary Examiner—Ljiljana Ciric
(74) Attorney, Agent, or Firm—Harness, Dickey & Pierce, P.L.C.

(57) ABSTRACT

A method of controlling a heating system including at least a first stage heat pump and a second stage auxiliary heater, and a control that implements the method. The control shuts off the first stage heat pump during cold outside temperatures without the need to directly sense the outside temperature. The method includes selectively turning on the first stage heat pump or the second stage auxiliary heater based upon a measure of the amount of time at least one of the stages was on verses the time neither of the stages was on. This can be implemented with a counter that increases when neither the heat pump nor the auxiliary heater is on, and that decreases when either the heat pump or the auxiliary heater is on.

28 Claims, 5 Drawing Sheets

CONTROL FOR HEAT PUMP WITH AUXILIARY HEAT SOURCE

BACKGROUND OF THE INVENTION

During periods of extreme cold, heat pumps usually cannot provide enough heat to maintain the desired inside temperature. For this reason, it is common, particularly in areas that regularly have periods of sustained cold temperatures, to provide an auxiliary heat source. These auxiliary heat sources are typically an electric heater or a fossil fuel (e.g., gas) furnace. In the case of fossil fuel furnaces, it is undesirable that the heat pump and the furnace operate at the same time. The most common solution to preventing the heat pump and auxiliary fossil fuel furnace from operating simultaneously is to install a fossil fuel kit. However, fossil fuel kits are expensive and usually require installation of a separate control panel and at least two temperature sensors. The installer typically must set/adjust an outdoor temperature at which the compressor is locked and the auxiliary fossil fuel furnace is used instead. However, the proper temperature varies with the heat pump efficiency, home insulation, current weather conditions (e.g., sunny or cloudy) and the interior temperature set point.

SUMMARY OF THE INVENTION

The present invention relates to a control for a heat pump having an auxiliary heat source that operates the auxiliary heat source and locks out the heat pump based on the estimated heating load, rather than on directly sensed outside temperature. The estimate of heat load is based on the temperature relative the set point temperature and duty cycle of the load. The estimate may then be used to decide when to lockout the heat pump. This eliminates the need to install a fossil fuel kit, and in particular to install the outside temperature sensors typically included in such kits. The method of the present invention operates the auxiliary heat source and locks out the heat pump based on the relative time that either of the heat sources is "on" and the time that both of the heat sources are "off".

This can be conveniently implemented using a counter that increments when a heat source is "on" and decrements when the heat sources are "off" (or vice versa). Thus the counter acts as a measures of the heat load, a high counter indicating that the heat sources have been "on" relatively more time than they have been "off", which it typically the result of unusually cold outside temperatures, and a low counter indicating that the heat sources have been "off" relatively more time than they have been "on". The controller turns "on" the heat pump if there is a call for heat and the counter is below a first threshold, and turns "on" the auxiliary heat source if there is a call for heat and the counter is above the first threshhold. The controller also turns "on" the auxiliary heat if the counter reaches a second threshold before the demand for heat is satisfied. The control may delay turning "off" the heat pump after turning "on" the auxiliary heat source, to allow it to continue to provide heat as the auxiliary heat source warms up.

The control and the control method of the present invention automatically take into installation-specific parameters such as heat pump efficiency and home insulation, as well as variable parameters, such as current weather conditions and inside temperature set point. Thus, the actual operation of the system is not dependent upon temperatures settings based upon estimates made at the time of the installation of the system, and automatically takes into account changes in conditions.

DETAILED DESCRIPTION OF THE INVENTION

The present invention is a control and a control method for operating a heating system that includes both a heat pump and an auxiliary heat source or heater which generally prevents concurrent operation of the heat pump and the auxiliary heater, based on estimated heating load, rather than on a direct measurement of outside temperature. This eliminates the need for installing and connecting outside temperatures, the difficulties is accurately establishing the proper set points. This also results in operation that is generally more comfortable and efficient, automatically adapting to changing outside weather conditions and inside set points, which systems relying solely on sensing outside temperature cannot do.

Figure 1:
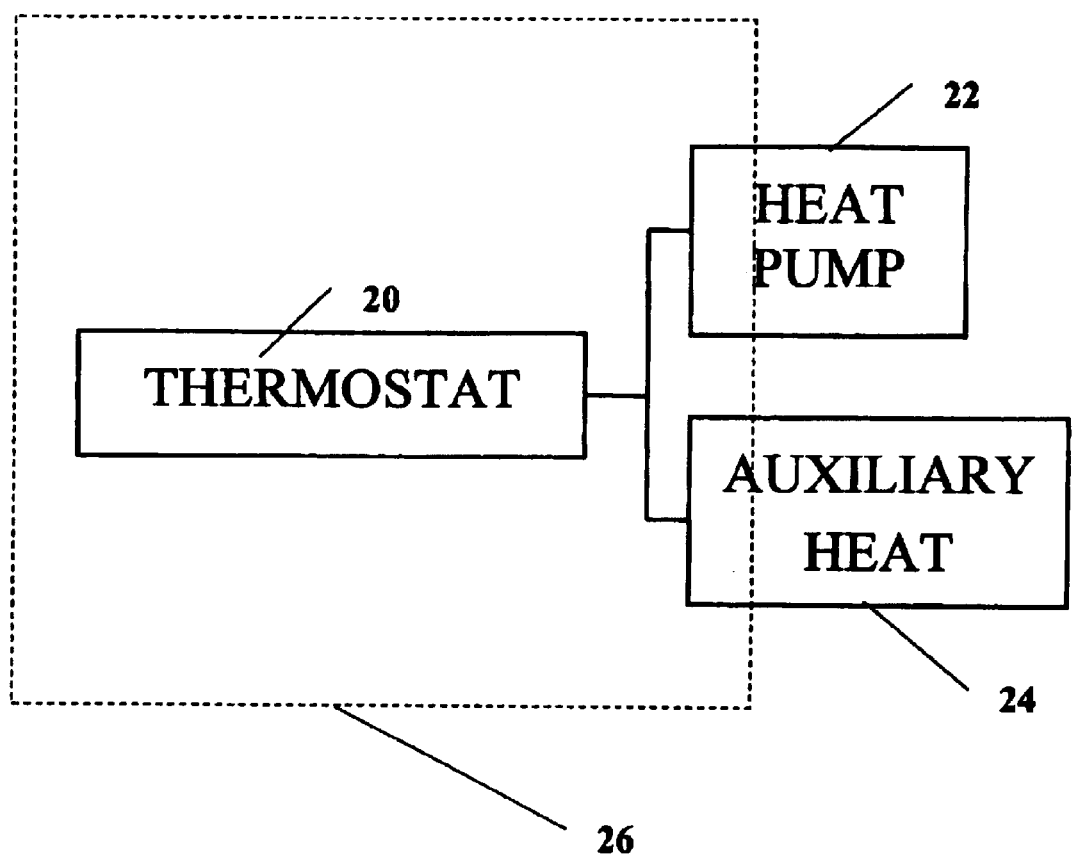
FIG. 1 is a schematic diagram of the control of the present invention, as it would be connected to a heat pump and auxiliary heater.

A control constructed according to the principles of the present invention is indicated generally as 20 in FIG. 1. The control 20 may be, for example, a thermostat that includes a processor programmed to implement the method of this invention. The control 20 is connected to a heat pump 22 and to an auxiliary heater 24, for controlling the heat pump and auxiliary heater to heat a space 26.

The control 20 is adapted to accept a set-point temperature S from the user, and when the temperature in the space 26 drops below the set-point temperature, the control 20 turns on the heat pump 22 and/or the auxiliary heat source 24. In actuality, the control may turn on the heat pump 22 or auxiliary heat source 24 at a temperature slightly different from the set-point temperature (for example $3/16°$ above the set-point temperature) so that the temperature in the space 26 does not drop below the set-point temperature. The control also turns off the heat pump 22 and/or auxiliary heat source 24 when the temperature in the space 26 rises above the set-point temperature. In actuality, the control may turn off the heat pump 22 or auxiliary heat source 24 at a temperature slightly different from the set-point temperature (for example $12/16°$ above the set-point temperature) to provide a relatively constant, comfortable temperature without excessively cycling the heat pump 22 or auxiliary heat source 24.

The controller 20 includes a counter, which, whenever either of the heat sources (heat pump 22 and/or auxiliary heat source 24) is "on", increases or increments at a predetermined rate to a predetermined value T1. If counter reaches the predetermined value T1 before the temperature reaches the set-point temperature, the control interprets this heat pump inefficiency as being the result of relatively cold outside temperatures. The control 20 subsequently turns "on" the auxiliary heat source 24, and turns "off" the heat pump 22. The control 20 may delay turning "off" the heat pump 22 slightly (e.g., for one minute) to continue to provide heat to the space 26 until the auxiliary heat source 26 can take over. The auxiliary heat source 24 continues to heat the space 26 until the temperature exceeds the control's target temperature, at which time the control turns "off" the auxiliary heater 24.

While both the heat pump 22 and the heater 24 are turned "off", the counter decreases or decrements at a predetermined rate to a predetermined value, preferably 0 in the first embodiment. If the temperature again drops below the set-point temperature S1, and the counter is above predetermined value T2, the control turns "on" the auxiliary heater 24. However, if the counter has dropped below the predetermined value T2, indicating a lower demand for heat, then the control 20 turns "on" the heat pump 22.

So long as one of the heat sources (heat pump 22 or auxiliary heater 24) is "on", the counter is increased or incremented to a maximum, and when both of the heat sources (heat pump 22 and auxiliary heat source 24) are "off", the counter is decreased or decremented to a minimum (zero in the preferred embodiment). Thus the counter serves as a measure of the relative amount of time that at least one of the heat sources is "on", relative to the amount of time that both of the heat sources are "off", which is also a measure of the heating demand for the space 26. When the demand is high, as typically occurs during periods of low outside temperatures, the counter remains high (i.e., above the predetermined value T2) which means that the auxiliary heat source will be used in favor of the heat pump when there is a call for heat. Conversely when demand is low, as occurs in more moderate outside temperatures, the counter remains low (i.e., below the predetermined value T2) which means that the heat pump will be used in favor of the auxiliary heater when there is a demand for heat. Another instance of high demand is when the heat pump is on during a period of low outside temperature, and is taking a long time to reach the point where the control would turn the heat pump "off" because the demand for heat has been satisfied. In this case the counter reaches the predetermined value T1 before the demand has been satisfied, and the control turns "on" the auxiliary heat source 24, and turns "off" the heat pump.

Operation

Figure 3:
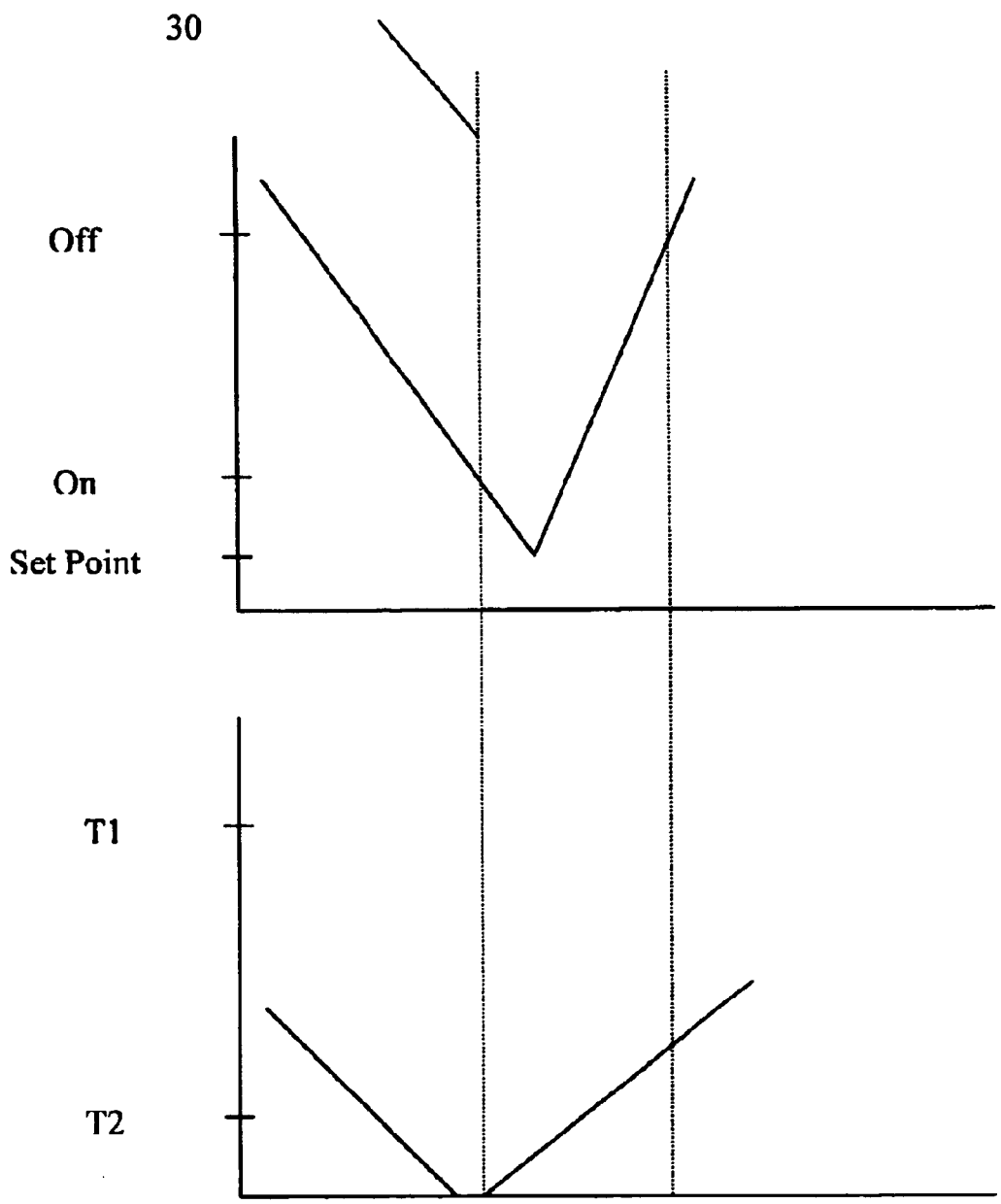
FIG. 3 is a graph comparing temperature versus time and the counter versus time, illustrating a case where the controller would turn "on" the heat pump rather than the auxiliary heat source.
Figure 4:
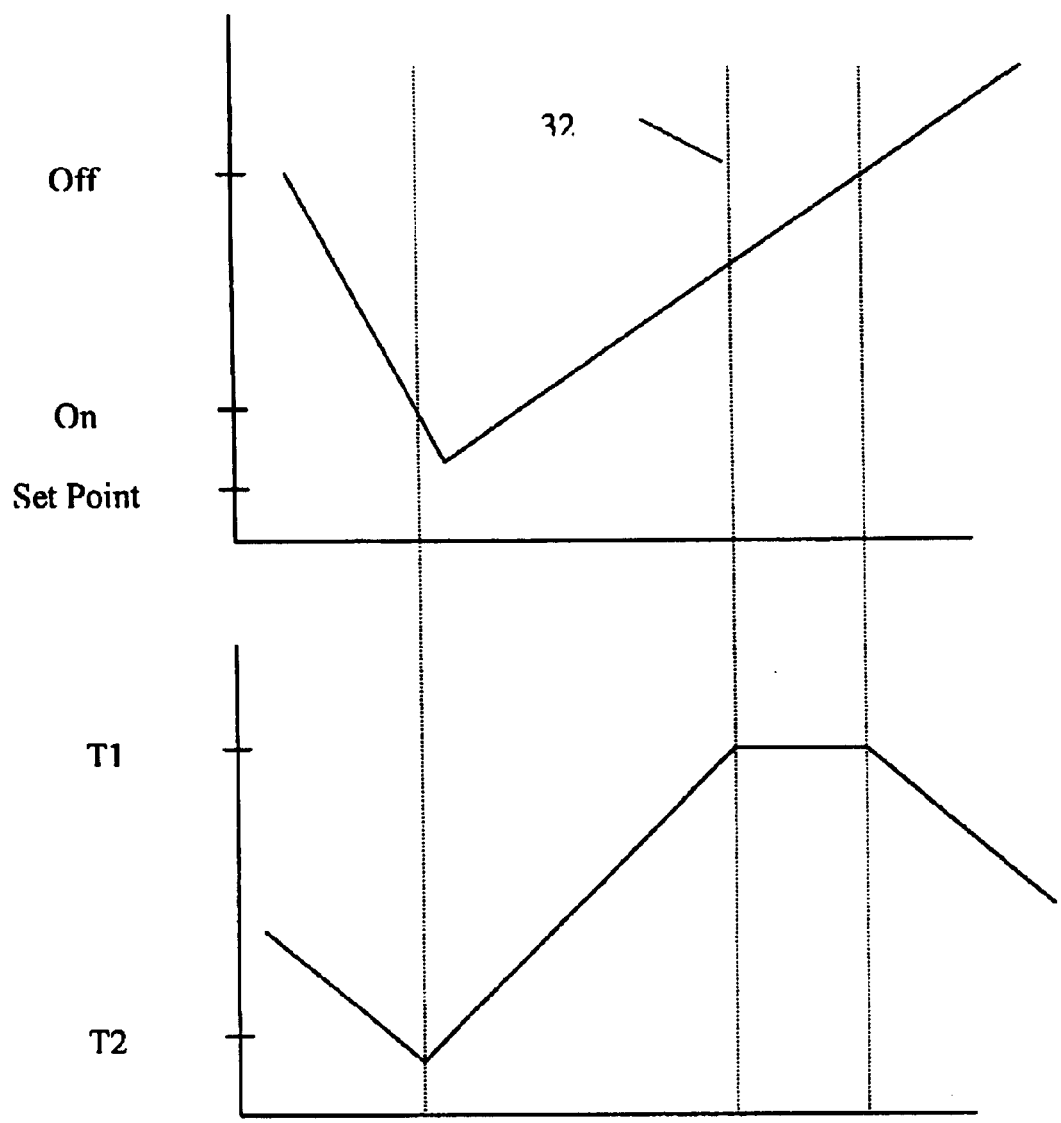
FIG. 4 is a graph comparing temperature versus time and the counter versus time, illustrating a case where the controller would turn "on" the auxiliary heat source and turn "off" the heat pump.
Figure 5:
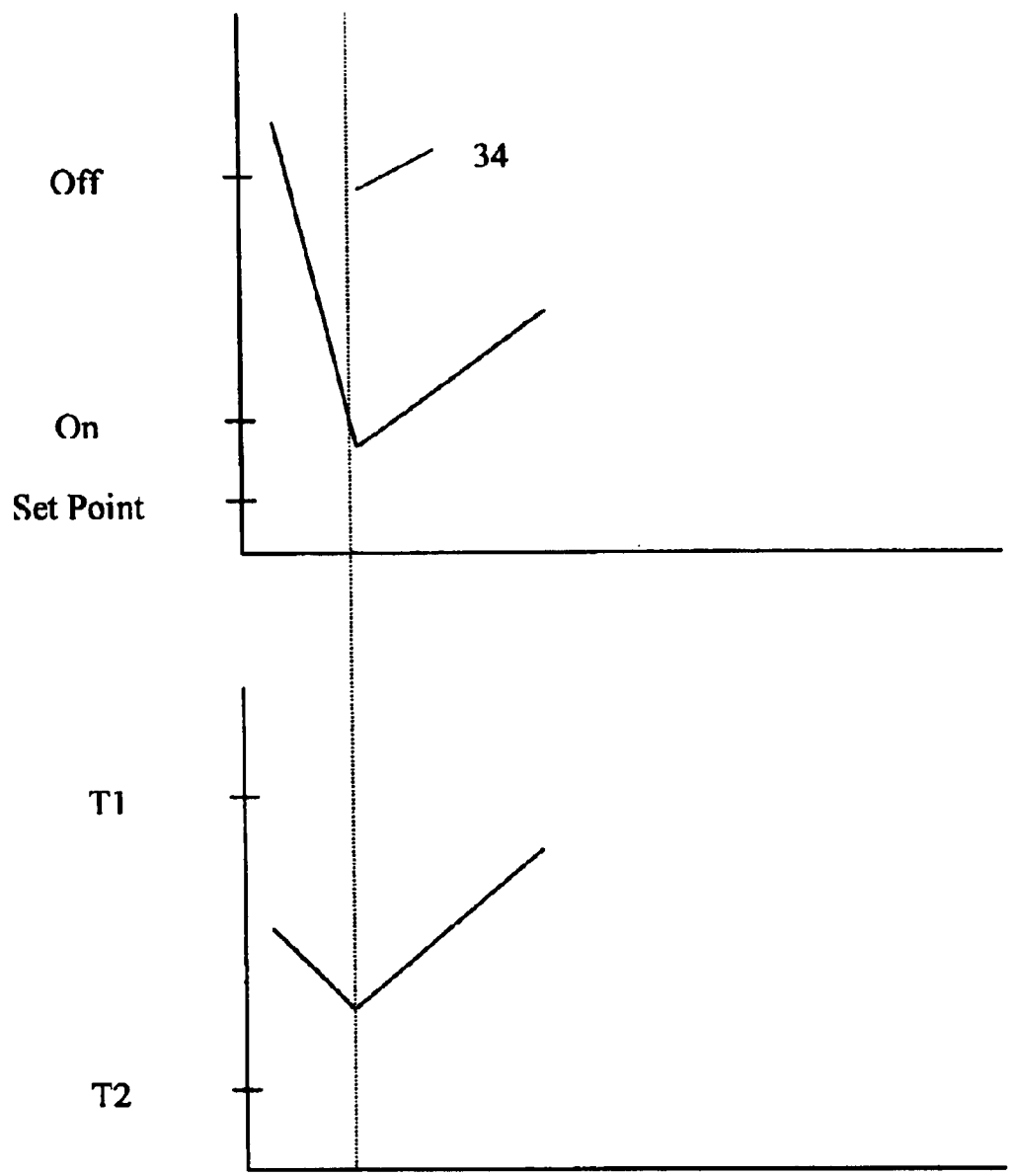
FIG. 5 is a graph comparing temperature versus time and the counter versus time, illustrating a case where the controller would turn "on" the auxiliary heat source rather than the heat pump.

The operation of the control method and the control for implement the method is illustrated in FIGS. 3–5. In a typical thermostat control, the call for heat is initiated slightly above the set point temperature, for example 3/16 of a degree above the set point temperature, so that the temperature does not actually drop below the set point temperature. Similarly, in a typical thermostat control, the call for heat is terminated at a point above the point where the call for heat is initiated, so that the heater does not start and stop in quick succession, for example 12/16 of a degree above the set point.

As illustrated in FIG. 3, at the start of the control method, when both the heat pump 22 and the auxiliary heat source 24 are "off", the temperature in the space 26 drops to the "on" temperature indicated by line 30, at which the control would normally initiate the call for heat. At this time the counter, which had been decreasing because neither the heat pump 22 or the auxiliary heater 24 were "on", is below both the threshold value T2, and thus the control will turn on the heat pump 22, and not the auxiliary heater 24. In fact, the counter had decreased to its minimum value (0 in the preferred embodiment) where it stayed until the heat pump 22 turned on and the counter began to increment. In effect, in normal outside temperature conditions the temperature in the space 26 drops at a slower rate than the counter decreases, so that the counter will be below T2 when there is a again a call for heat, and the controller turns on the heat pump to causes the heat pump.

Figure 2:
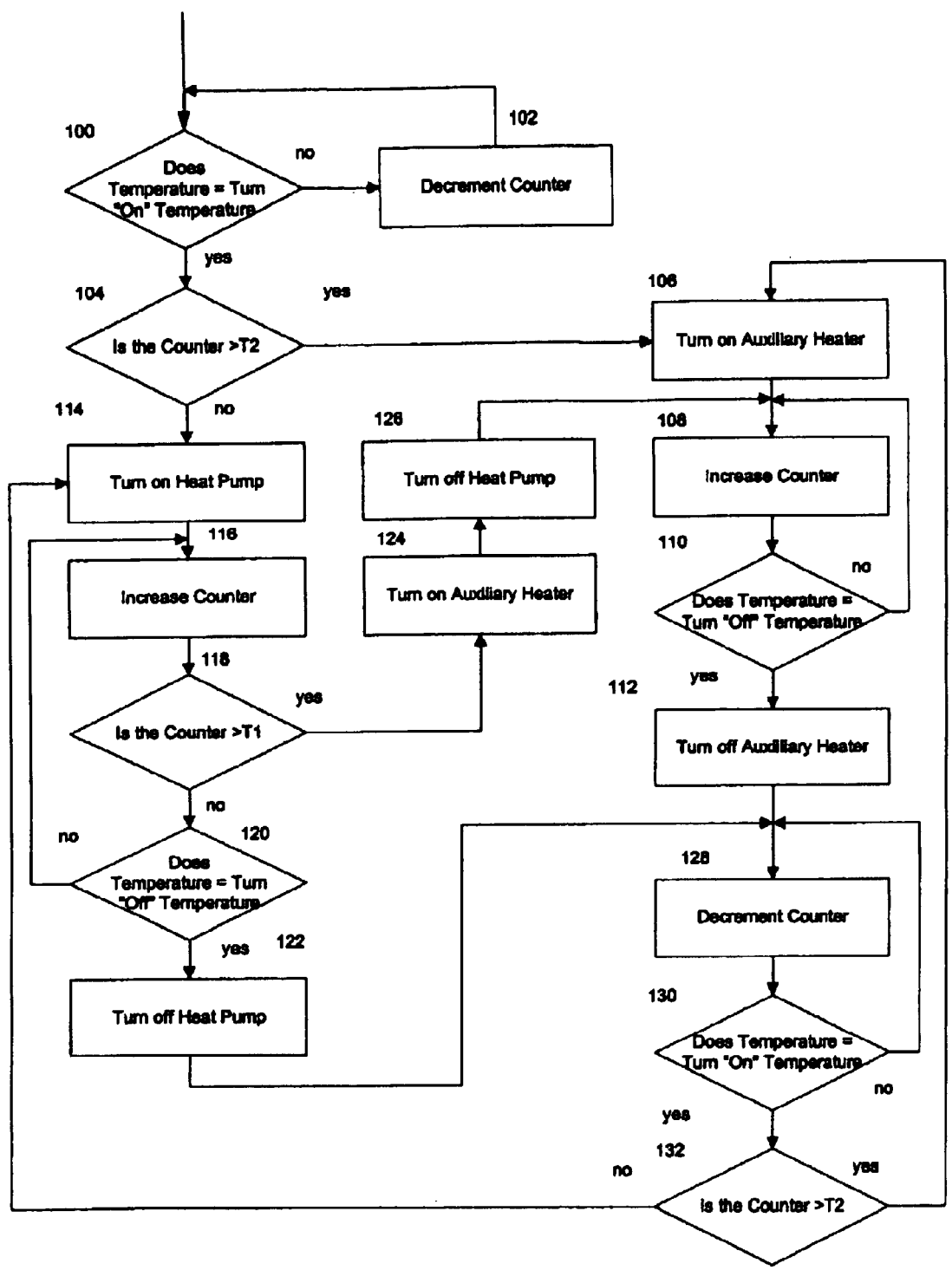
FIG. 2 is a flow chart of the process of the present invention.

This process is illustrated in FIG. 2, where at 100 the control determines whether the temperature equals the "on" temperature. For so long as the temperature is above the "on" temperature, the control decrements the counter at 102, and again tests at 100 whether the temperature is below the "on" temperature. Once the temperature equals the "on" temperature, at 104 the control determines whether the counter is above or below the predetermined value T2. If at 104 the counter is above T2, then at 106, the control turns "on" the auxiliary heat source 24, and at 108 the control increases the counter. At 110 the control checks whether the temperature is below the "off" temperature. For so long as the temperature is below the "off" temperature, the control increments the counter at 108, and again tests at 110 whether the temperature equals the "off" temperature. Once the temperature equals the "off" temperature, at 112, the control turns the auxiliary heat source 24 "off". If at 104 the counter is below T2, then at 114 the control turns "on" the heat pump 22, and at 116 the control increases the counter. At 120 the control checks whether the temperature is below the "off" temperature. For so long as the temperature is below the "off" temperature, the control increments the counter at 116, and again tests at 120 whether the temperature equals the "off" temperature. Once the temperature equals the "off" temperature, at 120, the control turns the auxiliary heat source 24 "off".

As illustrated in FIG. 4, when the temperature in the space 26 drops to the "on" temperature, the control turns the heat pump 21 "on", and the counter begins to increase. If, as shown in FIG. 4, the counter increases to T1 before the temperature in space 26 reaches the "off" temperature (illustrated by line 32), then the control turns on the auxiliary heater 26, and turns off the heat pump 24, preferably after a short delay to that the heat pump continues to provide heat while the auxiliary heater warms up. In effect, in cold outside conditions, the heat pump 24 heats the space 26 slower than the counter increases, so that the counter will reach T1 before the temperature reaches the off temperature, and the controller turns on the auxiliary heater to finish heating the space 26 to the "off" temperature.

This process is illustrated in FIG. 2, where at 118, while the heat pump 22 is "on" the control tests whether the counter is greater than the predetermined value T1. If it is not the control continues at 120 to whether the temperature equals the "off" temperature. For so long as the temperature is below the "off" temperature, the control increments the counter at 116, and again tests at 120 whether the temperature equals the "off" temperature. Once the temperature equals the "off" temperature, at 120, the control turns the auxiliary heat source 24 "off". However, if the counter reaches T1 before the control turns the heat pump 22 "off", then at 124 the control turns "on" the auxiliary heat source 24, and at 126 turns "off" the heat pump 22. Then at 108 the control increases the counter. At 110 the control checks whether the temperature is below the "off" temperature. For so long as the temperature is below the "off" temperature, the control increments the counter at 108, and again tests at 110 whether the temperature equals the "off" temperature. Once the temperature equals the "off" temperature, at 112, the control turns the auxiliary heat source 24 "off".

As illustrated in FIG. 5, the temperature in the space 26 drops after the heat is turned off. If, as shown in FIG. 5, the temperature reaches the "on" temperature before the counter drops below T2 (illustrated by line 34), then the control will turn on auxiliary heater 26 rather than the heat pump 24. In effect, in cold outside conditions, the temperature in the space drops more quickly than the counter decreases, so that when the temperature reaches the "on" point, the counter is still above T2, and the controller turns on the auxiliary heater 26 to satisfy the demand for heat.

This process is illustrated in FIG. 2, when the heat pump 22 is turned "off" at 122, or the auxiliary heat source 24 is turned "off" at 112, then at 128, the control decreases the counter, and at 130 the controls tests whether the temperature is above the turn "on" temperature. For so long as the temperature at 130 is above the turn "on" temperature, the control decrements the counter at 128, and again tests at 130 whether the temperature equals the "on" temperature. Once the temperature equals the "on" temperature, at 132, the control tests whether the counter is greater than or less than the predetermined value T2. If the counter is less than T2, then at 114 the control turns "on" the heat pump 22. If the counter is greater than T2, then at 106 the control turns "on" the auxiliary heat source 24.

The "on" and "off" points for the thermostat relative to the set point are selected balancing the comfort of the occupants in the space, with reducing the cycling of the heat pump. The control points T1 and T2, and the rate that the counter increases and the counter decreases, are selected so that the control operates the heat pump and the auxiliary heat to maintain the set point temperature in the space 26 without directly sensing the outside temperature. In severely cold conditions the rate that the space cools when no heat is provided is higher, and judiciously selecting the rate that the counter decreases and the control point T2 causes the control to turn on the auxiliary heater rather than the heat pump, when the cooling rate is high. Similarly, in severely cold conditions the rate that the space hearts when heat is provided by the heat pump is lower, and judiciously selected the rate that the counter increases and the control point T1 causes the control to turn on the auxiliary heater (and turn off the heat pump) when the heating rate it low.

What is claimed is:

1. A method of controlling a multistage heating system including at least a first stage heat pump and a second stage auxiliary heater to shut off the first stage heat pump during cold outside temperatures without the need to sense the outside temperature, the method comprising selectively turning on the first stage heat pump or the second stage auxiliary heater based upon a measure of the amount of time at least one of the stages has been on versus the time neither of the stages has been on.

2. The method according to claim 1 wherein the measure of the amount of time at least one of the stages was on verses the time neither of the stages has been on is a counter that increments for each time period that either the first or the second stages is on and decrements for each period of time that neither the first or second stages is on.

3. The method according to claim 2 wherein the first stage heat pump is not turned on upon a call for heat if the counter exceeds a predetermined number.

4. The method according to claim 3 wherein the second stage auxiliary heater is turned on during a call for heat if the counter exceeds a predetermined number.

5. The method according to claim 4 wherein the first stage heat pump is on when the second stage heat turns on, the first stage heat turns off after a predetermined time elapses from when the second stage heat turns on.

6. A method of controlling a multistage heating system including at least a first stage heat pump and a second stage auxiliary heater, to shut off the first stage heat pump during cold outside temperature without the need to sense the outside temperature, the method comprising:

incrementing a counter at a predetermined rate when either the first stage heat pump or the second stage auxiliary heater on;

decrementing the counter at a predetermined rate when neither the first stage heat pump or the second stage auxiliary heater on is on;

turning on the first stage heat pump when there is a call for heat, and the counter does not exceed a pre-set value;

turning on the second stage auxiliary heater when there is a call for heat, and the counter exceeds a pre-set value, and turning off the heat pump a pre-set time after the auxiliary heater is turned on; and turning off the first stage heat pump and the second stage auxiliary heater on when there is no longer a call for heat.

7. The method according to claim 6 wherein the counter is incremented to a predetermined maximum value.

8. The method according to claim 6 wherein the counter is decremented to a predetermined minimum value.

9. The method according to claim 6 wherein the counter is incremented to a predetermined maximum value, and decremented to a predetermined minimum value.

10. The method according to claim 6 wherein the pre-set time that the first stage heat pump is turned off after the second stage auxiliary heater is turned on is zero.

11. The method according to claim 6 wherein the pre-set time that the first stage heat pump is turned off after the second stage auxiliary heater is turned on is one minute.

12. The method according to claim 6 wherein a call for heat occurs when a sensed temperature is below a set temperature less an offset.

13. The method according to claim 6 wherein there is no longer a call for heat when a sensed temperature is above a set temperature plus an offset.

14. A method of controlling a multistage heating system including at least a first stage heat pump and a second stage auxiliary heater, to shut off the first stage heat pump during cold outside temperatures without the need to sense the outside temperature, the method comprising:

incrementing a counter for each time period during which at least one of the first stage heat pump and the second stage auxiliary heater is on;

decrementing the counter for each time period during which neither the first stage heat pump or the second stage auxiliary heater is on;

turning on the first stage heat pump when a sensed temperature is less than a set temperature plus an adjustment, and the counter does not exceed a predetermined amount;

turning on the second stage auxiliary heater when a sensed temperature is less than a set temperature plus an adjustment, and the counter exceeds a predetermined amount; and turning off the first stage heat pump and the second stage auxiliary heater the heat sources when a sensed temperature is greater than a set temperature plus an adjustment.

15. The method according to claim 14 wherein the counter is incremented to a predetermined maximum value.

16. The method according to claim 14 wherein the counter is decremented to a predetermined minimum value.

17. The method according to claim 14 wherein the counter is incremented to a predetermined maximum value, and decremented to a predetermined minimum value.

18. The method according to claim 14 where the step of turning on the second stage auxiliary heater when a sensed temperature is less than a set temperature plus an adjustment and the counter exceeds a predetermined amount, further comprises turning off the first state heat pump a pre-set time after the second stage auxiliary heater is turned on.

19. The method according to claim 18 wherein the pre-set time that the first stage heat pump is turned off after the second stage auxiliary heater is turned on is zero.

20. The method according to claim 18 wherein the pre-set time that the first stage heat pump is turned off after the second stage auxiliary heater is turned on is one minute.

21. A control for controlling a heating system including a heat pump and an auxiliary heater as heat sources, to shut off the heat pump during cold outside temperature without the need to sense the outside temperature, the control configured to:
increment a counter at a predetermined rate when either heat source is on;
decrement the counter at a predetermined rate when neither heat source is on;
turn on the heat pump when there is a call for heat, and the counter does not exceed a pre-set value;
turn on the auxiliary heater when there is a call for heat, and the counter exceeds a pre-set value, and turn off the heat pump a pre-set time after the auxiliary heater is turned on; and
turn off the heat sources when there is no longer a call for heat.

22. The control of claim 21 further configured to increment the counter to a predetermined maximum value.

23. The control of claim 21 further configured to decrement the counter to a predetermined minimum value.

24. The control of claim 21 further configured to increment the counter to a predetermined maximum value and decrement the counter to a predetermined minimum value.

25. The control of claim 21 wherein the pre-set time that the heat pump is turned off after the auxiliary heater is turned on is zero.

26. The control of claim 21 wherein the pre-set time that the heat pump is turned off after the auxiliary heater is turned on is one minute.

27. The control according to claim 21 wherein a call for heat occurs when a sensed temperature is below a set temperature less an offset.

28. The control according to claim 21 wherein there is no longer a call for heat when a sensed temperature is above a set temperature plus an offset.

* * * * *